INVENTOR:
Per Johan Berggren de Nygorden.

June 20, 1967 P. J. BERGGREN DE NYGORDEN 3,326,621
CATADIOPTRIC IMAGING SYSTEMS
Filed Jan. 19, 1961 2 Sheets-Sheet 2

*INVENTOR:*
Per Johan Berggren de Nygorden.
BY
Homer R. Montague
Attorney

United States Patent Office 3,326,621
Patented June 20, 1967

3,326,621
CATADIOPTRIC IMAGING SYSTEMS
Per Johan Berggren de Nygorden, 2965 Decatur Ave., Bronx, N.Y. 10458
Filed Jan. 19, 1961, Ser. No. 83,742
2 Claims. (Cl. 350—179)

This invention pertains to optical imaging systems, and aims to provide a catadioptric imaging system requiring only spherical surfaces, yet which is characterized by relatively wide angle, large effective relative aperture and freedom from both spherical and chromatic aberrations within acceptable limits.

There have been many prior proposals for the use of catadioptric systems to achieve reasonably large relative apertures while taking advantage of the inherent freedom of reflective surfaces from chromatic aberrations; this last principle being the one so successfully exploited in the reflecting telescope. Unfortunately, and as is well known to those skilled in the art, while the use of curved reflecting surfaces gives complete freedom from chromatic aberrations, spherical reflectors introduce spherical aberration, and in an amount which increases sharply as the focal length of the reflecting surface is decreased. Hence, all efforts to obtain high relative apertures, and consequent large light-gathering power, by the use of simple spherically-curved reflectors of large diameter and short focal length, have been beset by the necessity for other complications to overcome such spherical aberration.

Thus, in the astronomical reflecting telescope, the surface which is to form the reflector is itself given a non-spherical figure (usually one which approaches a parabolic curve but is always completed by elaborate cut-and-try methods) to minimize the spherical aberration. In such instruments, the figured reflecting surface is the "first" surface of the reflector, and provides the entire light-gathering (objective) function without dependence on any refractive power in the body of the element. In the Mangin mirror, the silvered or reflecting surface is the "second" surface, so that the designer has available not only the figure of the reflecting surface, but also the figure of the first surface (as a refractor), and the thickness and nature of the glass, as adjustable parameters. In systems of the Schmidt type, a pure concave spherical reflector is combined with a correction plate whose function is to counteract the mirror's spherical aberration. In the Maksutor system, a first-surface spherical reflector is combined with a deeply-curved meniscus lens of lower power providing sufficient negative spherical aberration to neutralize the spherical aberration of the reflector; being of low power, the meniscus lens has negligible chromatic aberration.

All of these types have disadvantages which have severely limited their general adoption; those which provide the higher relative apertures, and hence high light-gathering power, involve the use of non-spherical surfaces which are difficult and expensive to make. In general, it has never been found possible to fully utilize the features of a simple spherically curved reflector, without the introduction of compensating devices which are themselves expensive, non-spherical, and/or which are merely approximations to meeting the optimum requirements.

It is a principal object of this invention to provide a two-element catadioptric lens system using only spherically-curved surfaces, but which completely eliminates the spherical aberration of a concave reflector, and this while providing mutual compensation for the chromatic aberrations of the components.

A further object of the invention is to provide a system of this kind using only moderate spherical curvatures to avoid light losses resulting from relatively grazing rays, and to minimize the occurrence of higher-order aberrations such as coma and astigmatism.

Still another object of the invention is to provide a system of the foregoing type utilizing a spherical catadioptric element of the Mangin mirror type, with a reflective second surface, in combination with a concavo-convex spherical lens whose positive chromatic aberration neutralizes the negative chromatic aberration of the refractive portion of the Mangin mirror, and whose positive spherical aberration is neutralized by the negative spherical aberration of the Mangin mirror.

In a catadioptric system using a Mangin mirror type of reflector, the positive spherical aberrations of the concave reflective second surface can be either fully, over- or under-corrected, as desired, by proper selection of the curvature and position of the first surface. Being analogous to a negative lens in character, such second surface also has a negative chromatic aberration. In this invention, the purpose of the second unit is to correct this negative chromatic aberration of the reflector, plus its own aberrations.

The invention is therefore a catadioptric optical system whereby the spherical and the chromatic aberrations are corrected within acceptable limits by the use of only spherically curved surfaces. The system has only two elements. The principal element is a Mangin mirror which is both refractive and reflective. Being a negative refractive element, its longitudinal chromatic aberration is also negative and its spherical aberration can by proper design also be made negative; specifically, according to the invention, the negative spherical aberration of the Mangin component can be made to have a value just compensating the positive spherical aberration of the positive refractor whose function is to neutralize the negative chromatic aberration of the Mangin component. Thus, the second element, located at the proper distance from the Mangin mirror, is a properly shaped positive refractor, whose main purpose is to correct the negative chromatic aberration of the Mangin mirror. In doing that, it will of course produce its own certain amount of spherical aberration, which is positive. But the Mangin mirror has by design been given a negative spherical aberration so calculated as to be of the same numerical value as the positive spherical aberration of the positive refractor; the latter amount being that necessarily involved in a spherical refractor capable of correcting the chromatic aberration of the Mangin mirror.

It is still another object of the invention to provide a system as described, whose physical design renders it applicable either to direct imaging upon a surface lying between the major components, or to imaging by a relaying reflector to a surface wholly behind the assembly of major components.

Yet another object of the invention is to provide a system of the foregoing type useful either in camera or projector operations (the latter including projecting television equipment), due to relatively short physical separation of the components.

A further important object of the invention is to provide a system as described in which the Mangin mirror component is constituted by a pair of boundary meniscus elements (one forming the base of the reflective surface), whose separation is made adjustable, and including a deformable (such as a liquid) refractive medium therebetween. In this way, the invention provides for adjustment of the position of the image plane of the system, or, in effect, for adjustment of its focus.

The above and other objects and advantages of the invention will best be understood by referring now to the following detailed specification of certain preferred embodiments, given by way of example rather than for purposes of limiting the scope of the invention. In the description, reference is made to the accompanying drawings, in which.

Figures 1, 2:
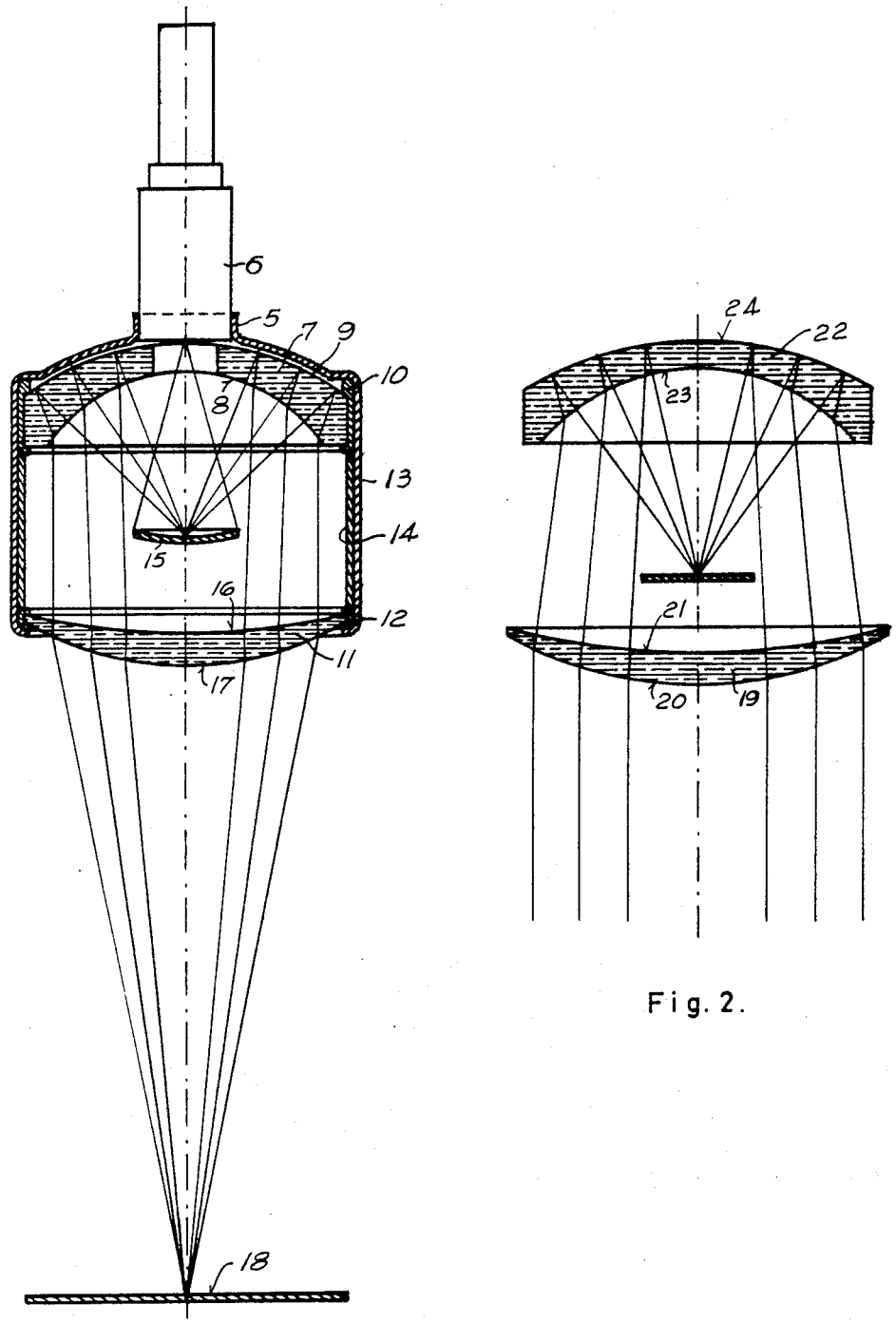
FIGURE 1 is a vertical sectional view of one form of a catadioptric imaging system according to the invention, shown as applied to a projection television receiver imaging apparatus.
FIGURE 2 is a similar view of such a system adapted for use in a photographic camera, with the camera film disposed within the system.

In FIG. 1 of the drawings, I have illustrated my improved optical system as applied to the projection of images formed initially by a television receiver type of cathode ray picture tube or projection kinescope, an application of considerable technical and commercial interest for reasons well known to those skilled in the art. Numeral 6 designates the usual body portion of such a cathode ray tube, which includes an electron gun and accelerating and focusing elements for the electron stream, to project the desired pattern upon a fluorescent target or screen 15. Screen 15 thus becomes the object of my catadioptric lens system, and the screen may if desired be curved, as shown, or flat, or oppositely curved, so as to suit different conditions and needs in special design and certain focusing problems. The position of the screen 15 may be made adjustable in the axial direction, for different image distances.

In this embodiment, I have shown my improved catadioptric optical system as integrally united with the cathode ray tube structure, so that, among other advantages, aberrations due to the usual thick exit window of the tube are avoided. Thus, the enclosure of the optical system itself constitutes a part of the evacuated space of the picture tube by reason of the housing or envelope 13 joined as at 5 in a vacuum-tight manner to the body of the tube 6. Within housing 13 the two principal components 7 and 11 of the optical system are mounted in the proper spaced relation. For example, the center-perforated Mangin mirror 7, having spherical refractive first surface 8 and spherical reflective second surface 9, is permanently mounted in the peripheral mounting ring 10, while the refractive element 11 is similarly mounted in the peripheral ring 12. These two elements are held in spaced precise relation by the tubular sleeve 14. The mountings are sealed in such a manner as to preserve the evacuated condition within the envelope 15.

Turning now to the details of the improved optical system of this embodiment, I provide in effect a Mangin mirror catadioptric element 7 having a spherically curved "first" surface 8 and a spherically curved "second" surface 9 on the transparent (for example, glass) body of this element. The second surface of this element is silvered or rendered specularly reflective by any convenient or known process, of which the prior art affords many examples. The element 7 is centrally apertured to admit the electron beam from tube component 6, and to allow it to stimulate the flourescent screen 15.

The second element of my catadioptric unit is constituted by the refractive element or lens 11, which has a concave inner surface 16 and a convex outer surface 17. It will be noted that while element 11 is of positive refracting power, the center being thicker than the edge, element 7 is thicker at its edge than at the apertured center thereof. When properly constructed in accordance with my invention, the combination enables the negative chromatic aberration of the Mangin mirror component 7 to be neutralized by the positive chromatic aberration of the lens 11, while at the same time the positive spherical aberration of the lens 11 is neutralized by the negative spherical aberration of the Mangin mirror component 7, and this without requiring the use of any but spherical curvatures for the major surfaces of these two components. In other words, the thickness and front surface curvature of the element 7 provide sufficient negative spherical aberration to compensate the aggregate positive spherical aberrations due to its own reflective surface 9 and to the positive component 11.

A typical successful combination of these components includes (for a diameter of both components of 10 inches) a lens 11 having a center thickness of one inch, with a radius for surface 17 of 9.975 inches, a radius for surface 16 of 22.250 inches, and glass having the following indices of refraction: $nC=1.6954$, $nD=1.702$, and $nF=1.719$. The Mangin mirror component 7 may have a center thickness of 0.875 inch and a radius at surface 8 of $-5.200$ inches, the radius of surface 9 being $-8.600$ inches. The glass of component 7 may have indices of $nC=1.5213$, $nD=1.5239$, and $nF=1.5302$. The distance at the axis between the interior surfaces 8 and 16 would be 8.250 inches, and the average distance between screen 18, at which the projected image is formed, and the vertex of lens 11, will be 19.500 inches. In the foregoing, the use of negative signs with the values of certain radii is in accord with the usual sign convention.

The operative characteristics of the system as described are somewhat as follows. Cathode ray tube unit 6 produces a highly luminous visible image on screen or target 15, the luminous rays proceeding to the Mangin mirror component 7. With screen 15 located with its center substantially at the center of curvature of surface 8, as shown, the light rays will pass perpendicularly (and without refraction) through this surface, and will be reflected at surface 9 back towards the first surface 8. This time the rays will be sharply refracted when passing through surface 8 and will pass nearly paraxially, as shown by the ray traces, towards the surface 16 of lens 11. The rays will be refracted by both surfaces of lens 11, and will be converged to a final focus at surface 18 to produce a projected and enlarged image at that surface of the original "object" appearing on screen 15. It will be observed that in no case do th erays forming the final projected image strike the curved surfaces of the glass at grazing angles, and in fact that there are no surfaces of extremely sharp curvature as required for many known catadioptric systems purporting to reduce the total spherical and chromatic aberrations. Further, since the system described uses no non-spherical surfaces, it can readily be manufactured at a minimum cost by usual lens fabrication techniques.

FIGURE 2 shows an arrangement of the same optical components, except for the lack of an aperture in the Mangin mirror element, adapted for use as a camera imaging system. Thus the Mangin mirror element is designated as a whole by numeral 22, having the reflective surface 24 corresponding to surface 9 of FIG. 1, and the refracting surface 23. Lens element 19 has surfaces 20 and 21 directly cognate to the surfaces of lens 11 of FIG. 1. The device in this case is intended to image a distant object, so that the incoming rays (arriving from below in FIG. 2) are essentially parallel and are bent toward the axis (converged) by positive lens 19, which if desired may economically be made larger than the Mangin mirror for more light-gathering ability. The convergent rays from lens 19 are refracted negatively at the first surface 23 of the Mangin mirror, and pass to the reflective surface 24 whence they are reflected back through surface 23 and converge in focused condition upon the focal plane 25. It will be observed that in the preferred case, the rays returning from surface 24 towards surface 23 are not refracted by the latter surface, the system being calculated and arranged so that these rays are directed towards the center of curvature of surface 23, comparably to the rays leaving fluorescent screen 15 in the case of FIG. 1.

Usual arrangements for supporting a photographic element at the location of focal plane surface 25 are provided, and for its changing or removal, or the feeding of film strip through this location, such not being shown in detail since they do not form an essential element of the novelty herein.

Figure 3:
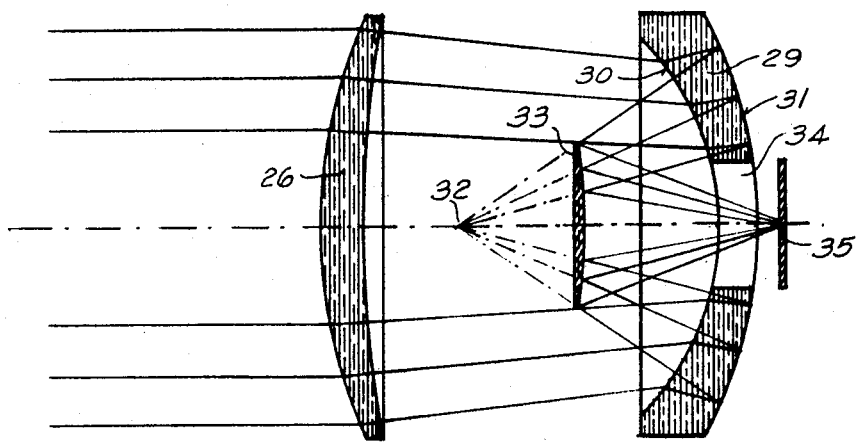
FIGURE 3 is a view of the FIGURE 2 system modified to permit the camera film to lie outside the optical system or assembly.

To avoid the necessity for complications incident to the maintaining of the photographic film or the like between the components as illustrated in FIG. 2, the final image may be relayed to a position beyond the Mangin mirror element as illustrated in FIGURE 3 of the drawings. Here again, the Mangin mirror element 29 is centrally apertured as at 34, so that with a distant (for example, an infinitely distant) object, the rays are converged by lens 26 and refracted at the first surface 30 of mirror element 29, thence convergently reflected at the mirror surface 31, and directed (without refraction at surface 30) towards the theoretical focal plane at 32. However, a slightly convex reflector 33 is interposed to again reflect these converging rays to a focus at the film plane 35, positioned outside the main system, via aperture 34. That is, the convexity of surface 33 produces a sufficient divergent effect on the rays to allow such an "outside" position of the focal plane. It will be understood that the components and relations, as in the embodiments earlier described, again satisfy the basic attribute of the invention; namely, that the negative chromatic aberration of the Mangin mirror element is neutralized by the positive chromatic aberration of the other, and that the positive spherical aberration of the meniscus refractor lens is neutralized by the negative spherical aberration of the Mangin mirror element.

Figure 4:
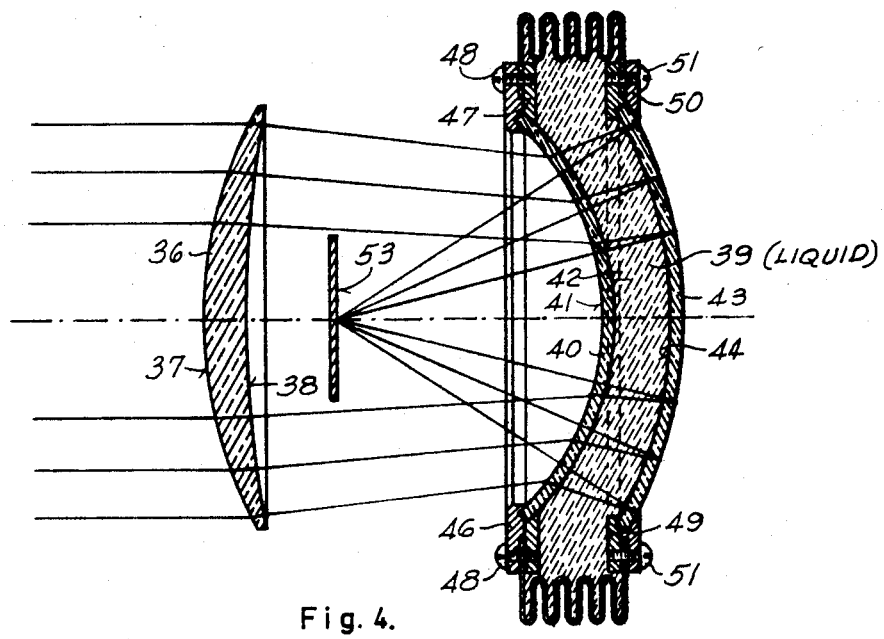
FIGURE 4 is a sectional view of a system similar to those illustrated as above, but with provision for altering the effective thickness of the catadioptric element of the system, for focusing purposes.

FIGURE 4 of the drawings shows a further adaptation of the system of the invention, generally following FIG. 2 but providing for a change in the position of the final focal plane, such as to allow for example for the focus adjustment for relatively nearer object, without the necessity for a physical adjustment of the position of the film plane 53. Thus, the Mangin mirror component 39 is actually made as a variable-thickness liquid lens, consisting of an interior transparent optical glass shell 40 with its first surface 41 and second surface 42 (the latter in contact with the liquid body), and an exterior transparent optical glass shell 43 with its first surface 44 also in contact with the liquid body, and its second surface silvered for reflection. The optical shell 40 is mounted and sealed within a grooved ring 46 and a flat chamfered cover ring 47 secured to one another as by screws 48 about the border. A pleated bellows, which may be metallic, connects the ring assembly just described to a similar sealed assembly of rings 49 and 50, and screws 51, which mounts the reflective shell 43.

Preferably, the liquid in this assembly optically matches the glasses composing elements 40 and 43, and due consideration is given to the properties of the liquid when computing the front lens component 36 having surfaces 37 and 38 as already described in connection with FIG. 2. Provisions (not shown) are included for the proper mounting of the parts so that the separation of the shells 40 and 43, and hence the effective thickness of the Mangin mirror component, can be adjusted to allow the desired variable control of the focal plane of the entire device as a whole, and thus to enable rays proceeding from the object being imaged to be brought to a focus upon the plane 53, at which, for example, a photographic layer may be positioned. Thus, if the portion of the assembly securing shell 41 is held fixed relative to the front lens 36, and the shell 43 is allowed to be moved, the rays may be brought to a focus on the plane 53, for various object distances, without violating the principle that said plane is disposed at the center of curvature of shell 41's anterior surface.

While the invention has been described herein in some detail, so as to enable those skilled in the art to use and practice the same, these details are not intended to constitute limitations on the actual scope of the invention, as defined in the accompanying claims.

What is claimed is:

1. A catadioptric optical imaging system comprising, in combination, a centrally apertured convexo-concave spherical-surface Mangin mirror characterized by negative chromatic aberration and negative spherical aberration, and a concavo-convex spherical-surface lens element in spaced axial alignment with said Mangin mirror, said concavo-convex lens element being characterized by positive chromatic aberration and positive spherical aberration and being positioned with its concave surface facing the concave surface of the Mangin mirror; the chromatic and spherical aberrations of said Mangin mirror and said lens element being of such relative magnitudes as to effect neutralization of their aberrations with respect to the image produced by the system; and a reflector positioned axially between the Mangin mirror and said lens to reflect rays from said Mangin mirror through its aperture.

2. A catadioptric optical imaging system comprising, in combination, a convexo-concave spherical-surface Mangin mirror characterized by negative chromatic aberration and negative spherical aberration, and a concavo-convex spherical-surfaced lens element in spaced axial alignment with said Mangin mirror, said concavo-convex lens element being characterized by positive chromatic aberration and positive spherical aberration and being positioned with its concave surface facing the concave surface of the Mangin mirror; the chromatic and spherical aberrations of said Mangin mirror and said lens element being of such relative magnitudes as to effect neutralization of their aberrations with respect to the image produced by the system; said Mangin mirror being formed of a liquid filled assembly providing for altering the spacing between its refractive anterior surface and its reflective posterior surface.

References Cited

UNITED STATES PATENTS

| 2,141,884 | 12/1938 | Sonnefield | 88—57 |
| 2,160,434 | 5/1939 | Harris | 313—110 |
| 2,188,581 | 1/1940 | Schlesinger | 313—110 |
| 2,295,802 | 9/1942 | Nicoll | 88—57 |
| 2,610,547 | 9/1952 | Back | 88—57 |
| 2,663,012 | 12/1953 | Beers | 178—7.88 |
| 2,701,983 | 2/1955 | Back et al. | 88—57 |
| 2,730,926 | 1/1956 | Back et al. | 88—57 |
| 2,817,270 | 12/1957 | Mandler | 88—57 |
| 3,016,798 | 1/1962 | Lawrence | 88—57 |

FOREIGN PATENTS 724,026  8/1942  Germany.

OTHER REFERENCES

Scientific Papers of the Bureau of Standards by Gardner, Scientific Paper No. 550 QC–1, U5 No. 550 C.5, pages 90–96 and 171 relied upon, published May 1927.

HERMAN KARL SAALBACH, *Primary Examiner.*

GEORGE N. WESTBY, ARTHUR GAUSS, JOHN W. HUCKERT, *Examiners.*

S. CHATMON, JR., *Assistant Examiner.*